(12) United States Patent
O'Leary, Sr.

(10) Patent No.: US 6,384,741 B1
(45) Date of Patent: May 7, 2002

(54) APPARATUS AND METHOD FOR PROVIDING HIGH MOUNTED VIEW OF TRAFFIC

(76) Inventor: Jerry P. O'Leary, Sr., 9221 Wooden Bridge Rd., Potomac, MD (US) 20854

( * ) Notice: Subject to any disclaimer, the term of this patent is extended or adjusted under 35 U.S.C. 154(b) by 0 days.

(21) Appl. No.: 09/761,163

(22) Filed: Jan. 16, 2001

(51) Int. Cl.[7] ............................................. G08G 1/017
(52) U.S. Cl. ....................... 340/937; 340/905; 348/149
(58) Field of Search ................................. 340/436, 435, 340/903, 937, 905; 348/113, 118, 148, 149

(56) References Cited

U.S. PATENT DOCUMENTS 4,968,124 A * 11/1990 Deckert et al. ............. 350/574
5,212,655 A * 5/1993 Boehle
5,523,811 A * 6/1996 Wada et al. ................. 348/118
5,767,905 A * 6/1998 Archambo ................... 348/373

* cited by examiner

Primary Examiner—Brent A. Swarthout
(74) Attorney, Agent, or Firm—Roberts, Abokhair & Mardula, LLC

(57) ABSTRACT

A camera or fiber optic lens is raised from an automobile on a retractable support to a height sufficient to view over SUVs to perceive an image of traffic beyond an obstructive SUV and transmit the image to a display that is viewable by the driver.

18 Claims, 3 Drawing Sheets

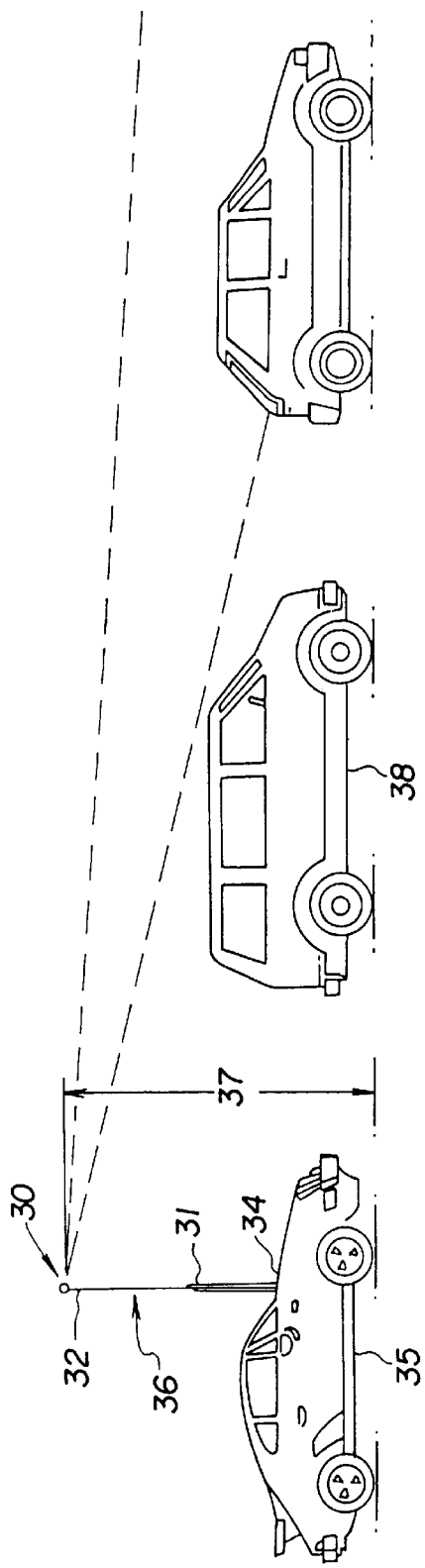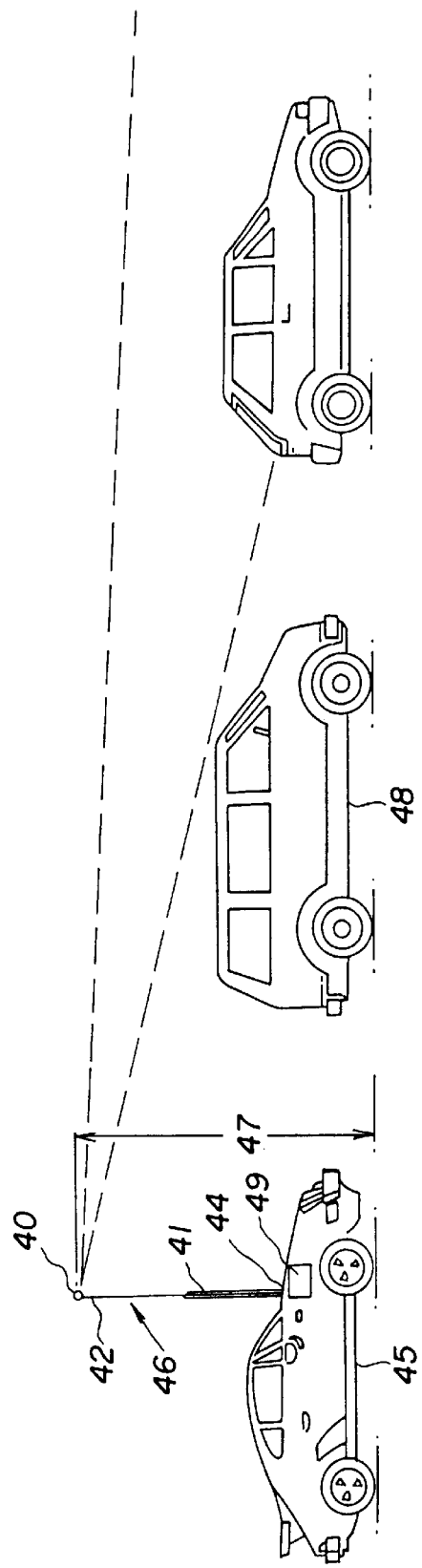

APPARATUS AND METHOD FOR PROVIDING HIGH MOUNTED VIEW OF TRAFFIC

FIELD OF THE INVENTION

The present invention is drawn to providing an automobile driver with a higher view of the highway traffic in front of the driver. More particularly, it is an apparatus and method for selectively raising a camera element associated with a passenger car to a high position in order to obtain a view of the road conditions beyond a view-obstructing vehicle, such as an SUV.

BACKGROUND INFORMATION

In the 1980's, minivans were "invented" and increased greatly in popularity. In the 1990's, the fasted growing segment of vehicles were "sport utility vehicles" or SUVs. One reason for the popularity of these vehicles is their higher height, which gives drivers a commanding view of the road. However, this has led to another problem for other drivers.

These other drivers have become increasingly frustrated when driving a "normal" car to see what is happening in front of them when a taller vehicle, such as an SUV, minivan, pick-up or panel truck, etc., pulls in front of them on the highway. The taller vehicle blocks the other driver's vision of the traffic further up the highway.

This can cause particular problems for those who believe in "defensive driving." If a defensive driver leaves a car length between him and the vehicle in front of him for every 10 miles per hour he is traveling, a gap is created that will usually be filled by fast drivers or those in a hurry.

If the defensive driver can see through the back and front window of the vehicle which pulled in front of him, then no problem exists. The defensive driver can keep the proper distance between his vehicle and the vehicle in front of him by coasting until the proper space is again made between his vehicle and the one in front of him.

When a taller vehicle, like an SUV, minivan, panel or pick-up truck, pulls in front of the defensive driver in an "normal" car, the defensive driver now has no choice but to slow down until he has again reached the proper spacing because he cannot get any advance warning by spotting brake lights of vehicles beyond the taller vehicle. Even when the defensive driver slows down, he is basically "blind" in that he must rely on the proper and timely braking of the taller vehicle for warning of road hazards since he cannot see the roadway beyond the taller vehicle blocking his vision.

To date, the most common "solution" to this problem has been to abandon the "normal" car and purchase an SUV to gain a relatively higher view over traffic. This "solution" is unacceptable for many drivers and only causes more problems for those in "normal" cars.

A better solution would be to provide a higher view for "normal" cars. A few inventions have provided means for mounting cameras on vehicles, but do not provide the necessary higher view. Other inventions provide means for gaining a higher view from vehicles, but are not applicable for ordinary cars.

U.S. Pat. No. 4,063,258 discloses a combination spotlight and camera for mounting on the roof of a vehicle. It lacks sufficient mounting height to see over obstructing vehicles and does not provide a display to the driver.

U.S. Pat. No. 5,648,835 discloses a monitor camera for mounting the front or rear of a vehicle, with an image pickup device being able to be accommodated within a support member for protection. It lacks sufficient mounting height to see over obstructing vehicles and does not explicitly provide a display to the driver.

U.S. Pat. No. 5,835,880 discloses a camera mounted on a vehicle for vehicle following with dynamic recognition. It lacks sufficient mounting height to see over obstructing vehicles and does not provide a display to the driver.

U.S. Pat. No. 5,963,148 discloses a road situation perceiving system that can use a video camera and a CRT display for perceiving snow, ice, a person, an animal and other impediments and obstacles existing on a road ahead of a subject vehicle, without relying on a driver's visual judgment. It lacks disclosure to a sufficient mounting height to see over obstructing vehicles.

U.S. Pat. Nos. 5,027,200, 5,121,200, 5,289,321, and 5,680,123 disclose systems for monitoring the rear and lateral views of vehicles using video cameras. They lack disclosure of forward viewing and sufficient mounting height to see over obstructing vehicles.

U.S. Pat. Nos. 4,949,186 and 4,514,068 disclose various surveillance cameras mounted on vehicles. They lack sufficient mounting height to see over obstructing vehicles and do not provide a display to the driver.

For use in non-traffic environments, U.S. Pat. No. 4,518,990 discloses mounting three television cameras on a military land vehicle for the driver, gunner and commander, respectively, U.S. Pat. No. 5,876,005 discloses using upper and lower pivoting support arms to mount a spotter scope or camera on an all-terrain vehicle, and U.S. Pat. No. 4,815,757 discloses a rapid deployment surveillance vehicle for detecting illegal immigration that uses a camera atop a telescopic mast erection/retraction assembly carried on an off-road vehicle with a leveling system.

BRIEF SUMMARY OF THE INVENTION

The present invention solves the problems caused by taller vehicles by providing a higher view of traffic with an apparatus and method for selectively raising a camera element associated with a passenger car to a high position in order to obtain a view of the road conditions beyond a view-obstructing taller vehicle, such as an SUV.

The camera element can be a lens associated with a fiber optic wire or a miniaturized imaging device such as a CCD (charge coupled device). Image processing means (including image stabilization) can be located in the car. The means for selectively raising the camera element can be telescopic (i.e., similar to a power antenna) or a hinged support (i.e., a pivoting mast). The viewing means inside the car can be associated with a HUD (heads up display), a navigational system display (i.e., an LCD or CRT in the center console or dashboard), or a flat display located at the top portion of the driver-side windshield.

It is an object of the invention to provide drivers with a view of traffic beyond obstructive, oversized vehicles, such as SUVs.

It is a further object of the invention to provide an electronic viewing means at a height sufficient to view over obstructive, oversized vehicles, such as SUVs, via a retractable support.

It is another object of the invention to provide a driver with a display of images perceived by an electronic viewing means at a height sufficient to view over obstructive, oversized vehicles, such as SUVs.

BRIEF DESCRIPTION OF THE DRAWINGS

FIG. 3 illustrates a third embodiment the present invention having a camera mounted on a telescoping support.

FIG. 4 illustrates a fourth embodiment the present invention having a fiber optic lens mounted on a telescoping support.

DETAILED DESCRIPTION OF THE INVENTION

The present invention provides a system and method for providing a high-mounted view of traffic to a driver. An electronic viewing means is raised from a collapsed condition to an erected condition at a sufficiently high, forward-facing position above a moving automotive passenger vehicle so as to view over an oversized vehicle. The viewing means is primarily directed to perceive traffic in front of said vehicle. An image is displayed to the driver by electronically processing at least one image of the traffic in front of the vehicle as viewed from said high mounted position.

The electronic viewing means is raised either telescopically or pivotally and can be a miniaturized electronic camera or a fiber optic lens associated with an electronic camera. The image is provided to the driver by a suitable display, such as a CRT or LCD mounted near the driver on the dashboard, console, ceiling or A-pillar, as well as by a HUD projected on the windshield or a printer mounted on the console or dashboard. A single image or a series of images can be displayed. If a series of images is displayed, such as by video, the images are preferably processed electronically to stabilize the viewed images.

As used herein, the term "camera" refers to any electronic imaging means capable of capturing an image representative of a perceivable condition, including, but not limited to, color, black & white and infrared electronic video and still cameras incorporating CCDs (charge-coupled devices), CMOS or CIDs (charge-injected devices). The terms "electronic viewing means" and "camera element" refer to a camera or optics associated with a camera.

Figure 1:
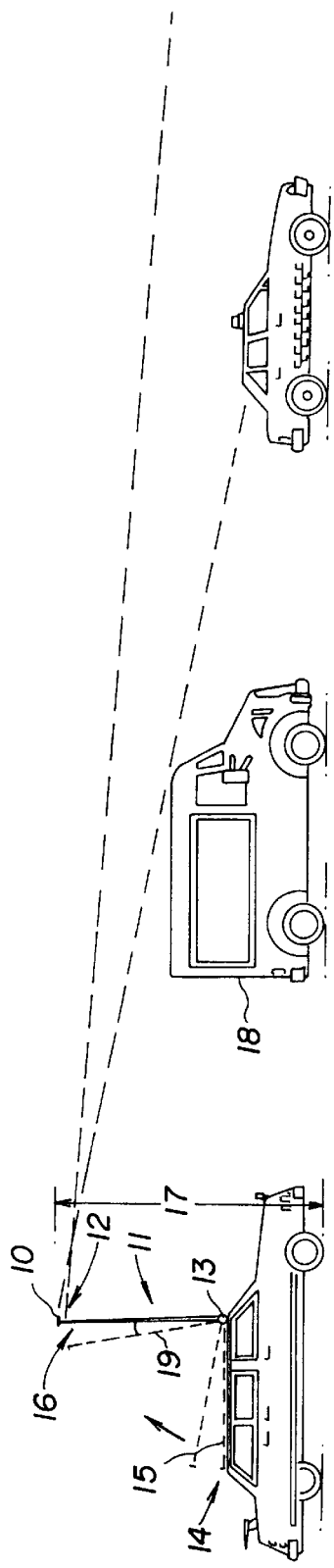
FIG. 1 illustrates a first embodiment of the present invention having a camera mounted on a pivoting support.

In a first embodiment, illustrated in FIG. 1, a miniaturized camera 10 is mounted on an end 12 opposite from a pivot 13 of a pivoting support 11 that is movable between a collapsed position 14, such as adjacent a roof line of the vehicle 15, to an erected position 16. In an erected position 16, the camera 10 is at a sufficient vertical height 17 to view over a vehicle 18 obstructing the driver's view of traffic.

Figure 2:
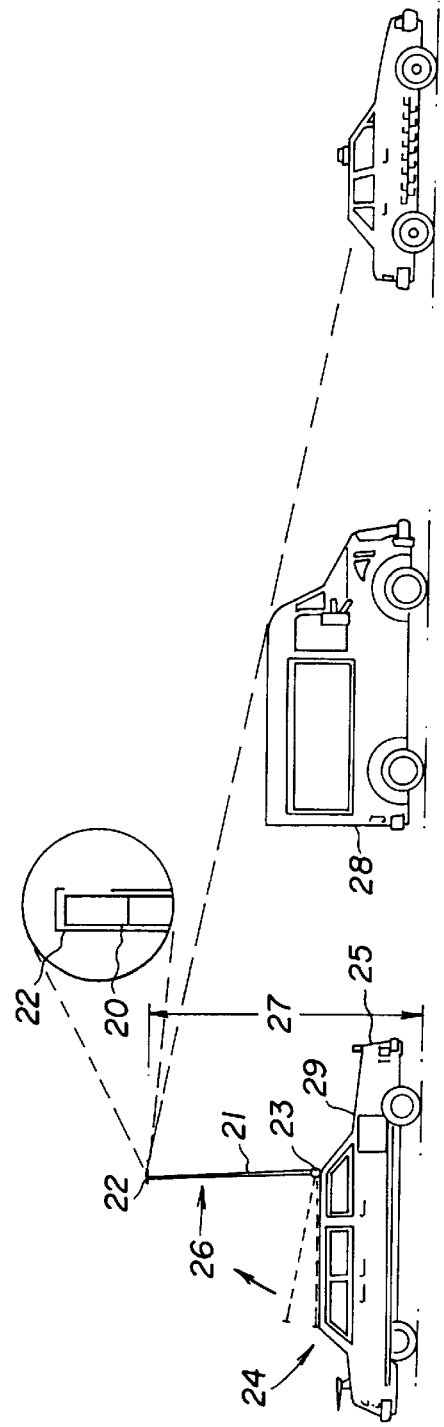
FIG. 2 illustrates a second embodiment the present invention having a fiber optic lens mounted on a pivoting support.

In another embodiment, illustrated in FIG. 2, a fiber optic lens 20 associated with a camera 29 is mounted on an end 22 opposite from a pivot 23 of a pivoting support 21 that is movable between a collapsed position 24, such as adjacent a roof line of the vehicle 25, to an erected position 26. In an erected position 26, the fiber optic lens 20 is at a sufficient vertical height 27 to view over a vehicle 28 obstructing the driver's view of traffic.

For these pivoting support embodiments, it is also possible to provide for pivot 13, 23 to rotate perpendicularly sideways at an acute angle, as illustrated at 19, so as to view around traffic from the side.

In a third embodiment, illustrated in FIG. 3, a miniaturized camera 30 is mounted on the movable end 32 of a telescoping support 31 that is movable between a collapsed position, such as adjacent a wheel well 34 of the vehicle 35, to an erected position 36. In an erected position 36, the camera 30 is at a sufficient vertical height 37 to view over a vehicle 38 obstructing the driver's view of traffic.

In yet another embodiment, illustrated in FIG. 4, a fiber optic lens 40 associated with a camera 49 is mounted on the movable end 42 of a telescoping support 41 that is movable between a collapsed position, such as adjacent a wheel well 44 of the vehicle 45, to an erected position 46. In an erected position 46, the fiber optic lens 40 is at a sufficient vertical height 47 to view over a vehicle 48 obstructing the driver's view of traffic.

For these telescoping embodiments, it is also possible to provide means for telescoping support 31, 41 to be selectively rotated about its vertical axis, so as to provide views in directions other than a forward-facing direction. This modification would be useful for when the system is employed for security or surveillance purposes.

In any of these embodiments, the image perceived by the camera may be sent to a display means by wired or wireless means. Within the vehicle, image processing/stablization means and cameras associated with a fiber optic lens can be located in any suitable location, including, but not limited to, a trunk, wheel well, ceiling, roof pillar, door pillar, door, firewall, engine compartment, rear deck, glove compartment, dashboard or under-seat location.

Figure 5:
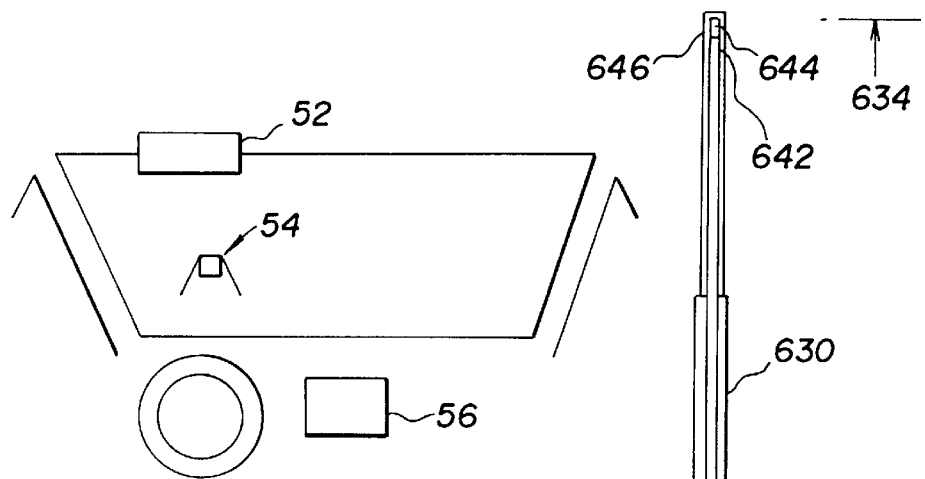
FIG. 5 illustrates a some driver displays included in the present invention.

As illustrated in FIG. 5, the display means will typically be located conveniently for the driver to view, such as by a ceiling/windshield-mounted LCD 52, windshield-displayed HUD 54, or console/dash-mounted navigation system CRT/LCD 56, although other displays and locations are also possible, including, but not limited to, a console-mounted thermal or inkjet printer display and an A-pillar, steering wheel or instrument panel display location. A driver wearable display, such as could be incorporated into a pair of eye glasses, could also be employed.

At present, there is no single preferred embodiment of the invention, since different embodiments are suited to different applications of the invention. For example, the pivoting support is generally better suited for: (i) use in OEM applications wherein the elements can be cosmetically hidden; (ii) use in supporting heavier miniaturized cameras; and (iii) use in applications wherein the vehicle has a roof line of sufficient length to incorporate the pivoting support in a collapsed condition. The telescoping support is better suited for: (i) use in retrofit applications wherein the support replaces an existing power antenna; (ii) use in supporting lighter fiber optic lens assemblies; and (iii) use in applications wherein no suitable length of roof line is available for a pivoting support. Likewise, HUD and dashboard mounted CRT displays are generally easier to incorporate into OEM applications whereas ceiling and console mounted LCDs are easier to incorporate as a retrofit. However, even these generalities have exceptions, since it is also possible to retrofit the present invention to use OEM HUD or navigation system displays.

Figure 6:
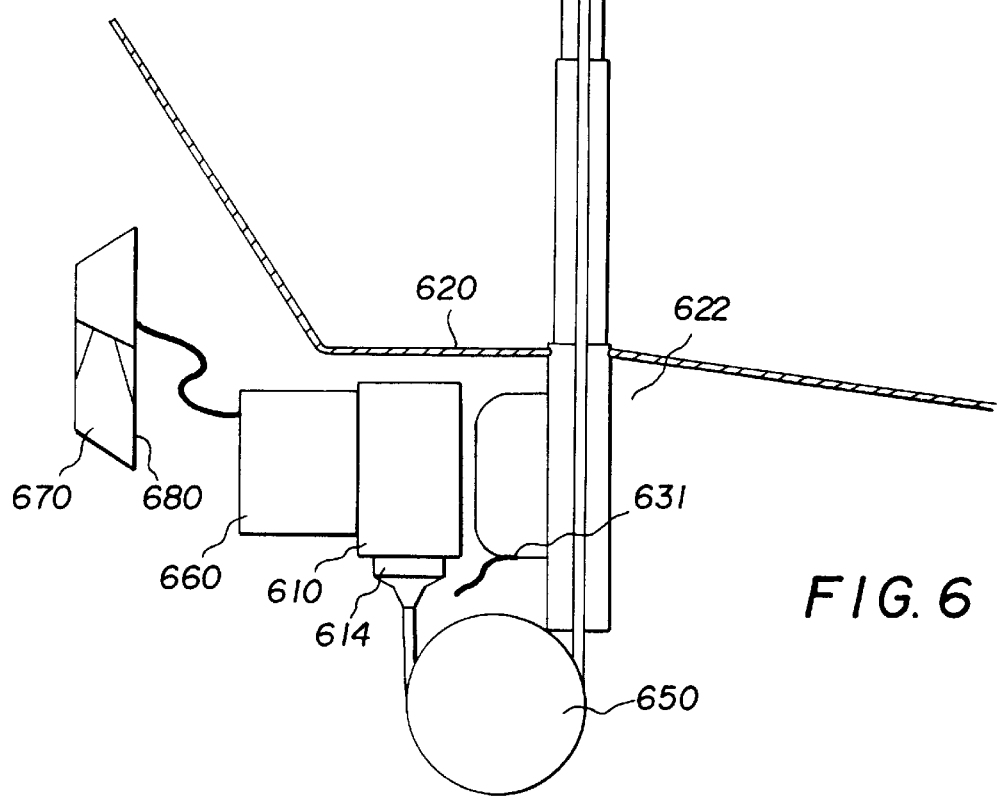
FIG. 6 illustrates another embodiment the present invention having a fiber optic lens mounted on a telescoping support.

An exemplary embodiment of the present invention is illustrated in FIG. 6. In this system, a video camera 610 having a CCD imaging means is mounted within a vehicle 620. Suitable locations include spaces within a trunk or a wheel well 622. A retractable mast 630, such as or similar to a standard telescoping power antenna is also mounted on the vehicle 620, preferably near the camera 610. The mast 630 can be connected 631 to the automobile radio and used, at a first height 632, as a radio antenna, and at a second height 634, for traffic perception. A fiber optic lens employing optical fiber 648, such as typically used in fiberscopes and borescopes, is preferably mounted on a reel 650, with a camera adapter lens 614 at one end mounted to the video camera 610 and the objective lens 642 and side-viewing tip adapter 644 attached to a tip portion 646 of the mast 630. As the mast 630 is extended, the optical fiber 648 unwinds from the reel 650 and are rewound when the mast 630 is retracted.

Since the tip portion 646 of the mast will tend to oscillate in use on a highway, electronic image stabilization 660 can be incorporated into or downstream from camera 610. The stabilized image 670 is then displayed on the display means 680 for the driver to view.

The erection and retraction of the support/mast in the present invention is accomplished by any suitable means and is preferably actuated by a switch provided near the driver.

An apparatus and method for providing high mounted view of traffic has now been shown. It will be appreciated by those skilled in the art that other variations in the present invention will be possible without departing from the scope of the invention as disclosed. Accordingly, the present invention should be determined only from the claims presented herewith.

I claim:

1. A method of providing a high-mounted view of traffic to a driver, comprising:

raising an electronic viewing means to a high mounted forward-facing position above a moving automotive passenger vehicle, wherein said viewing means is directed to view traffic in front of said vehicle;

electronically processing at least one image of traffic in front of said vehicle as viewed from said high mounted position; and displaying said at least one image to said driver; wherein said viewing means is raised from a position adjacent said vehicle body to a height sufficient to view over an oversized vehicle.

2. The method of providing a high-mounted view of traffic to a driver of claim 1, wherein the electronic viewing means is raised telescopically.

3. The method of providing a high-mounted view of traffic to a driver of claim 1, wherein the electronic viewing means is raised pivotally.

4. The method of providing a high-mounted view of traffic to a driver of claim 3, further comprising pivoting said electronic viewing means in a direction transverse to traffic flow.

5. The method of providing a high-mounted view of traffic to a driver of claim 3, wherein the electronic viewing means uses a fiber optic lens.

6. The method of providing a high-mounted view of traffic to a driver of claim 3, wherein the electronic viewing means is a miniature electronic camera.

7. The method of providing a high-mounted view of traffic to a driver of claim 1, wherein displaying of said at least one image to said driver is provided by a display selected from the group consisting of a dashboard-mounted CRT, a console-mounted CRT, a ceiling-mounted CRT, a windshield-mounted CRT, a dashboard-mounted LCD, a console-mounted LCD, a ceiling-mounted LCD, a windshield-mounted LCD, an A-pillar mounted LCD, a HUD projected on a windshield, a dashboard-mounted printer, and a console-mounted printer.

8. The method of providing a high-mounted view of traffic to a driver of claim 1, comprising electronically processing a series of images.

9. The method of providing a high-mounted view of traffic to a driver of claim 8, wherein electronic processing of images includes image stabilization.

10. A system for providing a high-mounted view of traffic to a driver, comprising:

an electronic viewing means;

means to raise said viewing means to a high-mounted forward-facing position above a moving automotive passenger vehicle, wherein said viewing means is pointed to view traffic in front of said vehicle;

means to electronically process at least one image of traffic in front of said vehicle as viewed from said high-mounted position; and means for displaying said at least one image to said driver; wherein said means to raise said viewing means extends from a position adjacent said vehicle body to a height sufficient to view over an oversized vehicle.

11. The system for providing a high-mounted view of traffic to a driver of claim 10, wherein said means to raise said viewing means is a telescopic support.

12. The system for providing a high-mounted view of traffic to a driver of claim 10, wherein said means to raise said viewing means is a pivotal support.

13. The system for providing a high-mounted view of traffic to a driver of claim 12, further comprising means to pivot said electronic viewing means in a direction transverse to traffic flow.

14. The system for providing a high-mounted view of traffic to a driver of claim 11, wherein the electronic viewing means is a fiber optic lens connected to a remotely mounted camera.

15. The system for providing a high-mounted view of traffic to a driver of claim 12, wherein the electronic viewing means is a miniature electronic camera.

16. The system for providing a high-mounted view of traffic to a driver of claim 10, wherein said means for displaying at least one image to said driver is selected from the group consisting of a dashboard-mounted CRT, a console-mounted CRT, a ceiling-mounted CRT, a windshield-mounted CRT, a dashboard-mounted LCD, a console-mounted LCD, a ceiling-mounted LCD, a windshield-mounted LCD, an A-pillar mounted LCD, a HUD projected on a windshield, a dashboard-mounted printer, and a console-mounted printer.

17. The system for providing a high-mounted view of traffic to a driver of claim 10, wherein said means for electronically processing produces a series of images.

18. The system for providing a high-mounted view of traffic to a driver of claim 17, wherein said means for electronically processing includes image stabilization circuitry.

* * * * *